(No Model.)
A. J. ROSSI & L. F. BECKWITH.
Artificial Production of Ice and Cold.
No. 236,843. Patented Jan. 18, 1881.
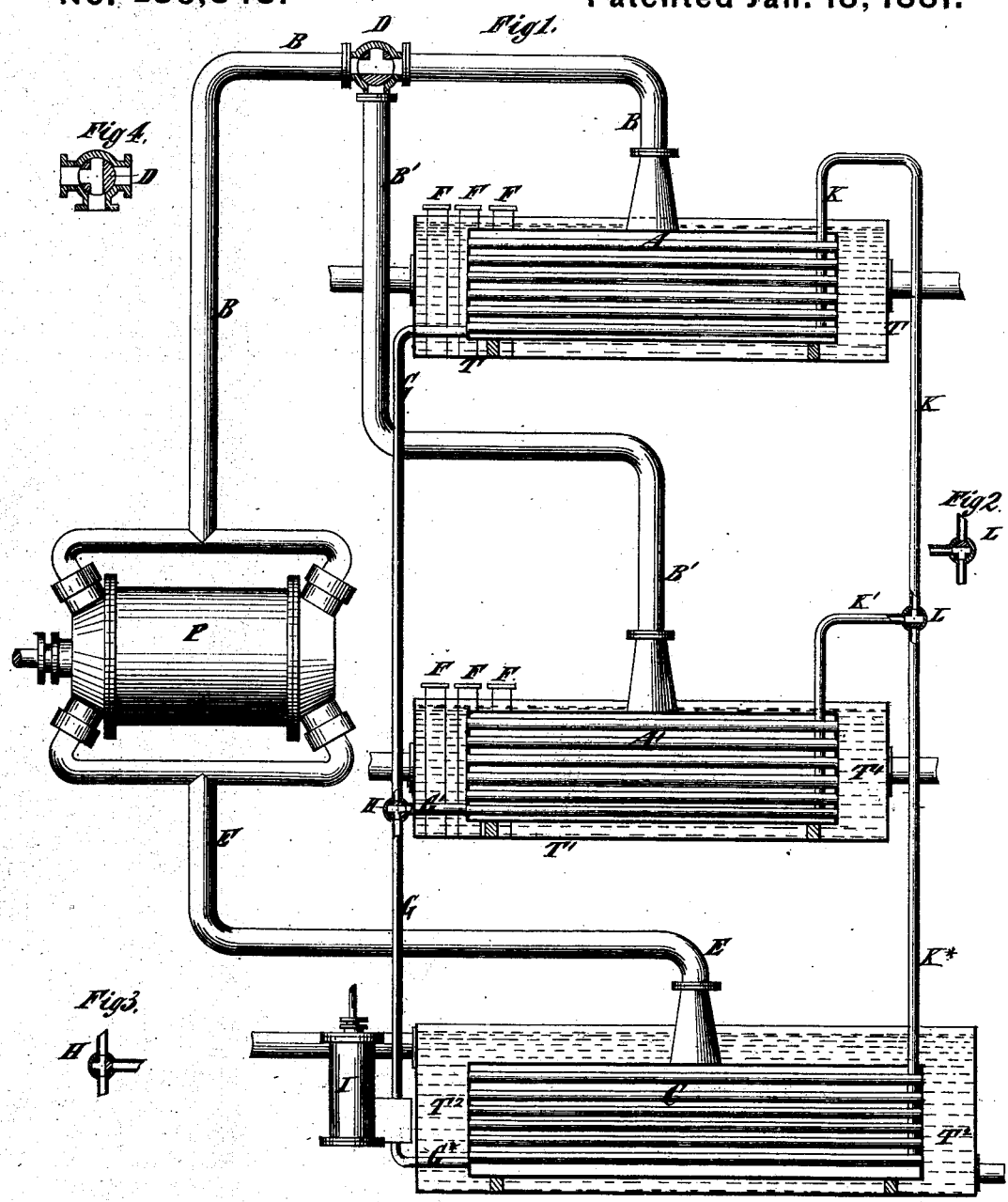

UNITED STATES PATENT OFFICE.

AUGUSTE J. ROSSI AND LEONARD F. BECKWITH, OF NEW YORK, N. Y.

ARTIFICIAL PRODUCTION OF ICE AND COLD.

SPECIFICATION forming part of Letters Patent No. 236,843, dated January 18, 1881.

Application filed October 5, 1880. (No model.)

*To all whom it may concern:*

Be it known that we, AUGUSTE J. ROSSI and LEONARD F. BECKWITH, of the city and county of New York, in the State of New York, have invented certain new and useful Improvements in the Production of Cold for Making Ice, and for other purposes, of which the following is a specification, reference being had to the accompanying drawings.

Glycerine, as is well known, is a great solvent for many of the substances, either solid, liquid, or gaseous, which water itself dissolves. Thus many gases which are very soluble in water are found to be absorbed by glycerine in large quantities. Among others, ammonia-gas is foremost.

We have ascertained that glycerine, even concentrated at 30° Baumé, as well as glycerine at 28° Baumé, and at lower degrees of concentration, absorbs large quantities of gaseous ammonia, varying, according to temperature and concentration, from two hundred and fifty to three hundred and fifty times, and more, its volume of gas. This absorption takes place with a great disengagement of heat. The liquid thus obtained by saturation has little or no pressures at ordinary temperatures. On this property we have based a new method for the artificial production of ice or cold. In the system of refrigeration in which this power of absorption has heretofore been made available to avoid mechanical compression, either, first, both the absorbent liquid and the absorbed material were volatile, in which case both were volatilized simultaneously under a vacuum produced by a mechanical action, the binary liquid being reconstituted by a mechanical compression and cooling of the mixed vapors, which liquefied the vapors of the less volatile absorbent under very small pressure, the absorbent thus reliquefied first absorbing the vapors of the more volatile constituent by chemical affinity, thus avoiding the excess of compression otherwise necessary; or, second, the absorbent not being volatile, or very little so, recourse has been had to "heat" to drive off the vapors of the absorbed material from the binary liquid, the pressures exerted by the gas thus generated on itself and a proper cooling being the means resorted to to bring about the liquefaction of the vapors of the absorbed material—the absorbent remaining behind—and the liquefied absorbed material being then allowed to vaporize by itself, no recourse being had to mechanical compression or aspiration, its vapors were reabsorbed by the liquid absorbent properly cooled, so as to reconstitute the binary liquid.

In this new system the particular and distinct features are, that, the "absorbent," being non-volatile and not capable of being vaporized under a limited vacuum produced mechanically by an aspiration and compression pump, the absorbed material volatilizes alone under vacuum, (as in case No. 2, by heat;) but a special mechanical contrivance (such as a double refrigerator) is used to effect the absorption of the vapors of the volatile absorbed material, so as to reconstitute the saturated liquid, thus avoiding the pressure, as in case No. 1. This is very distinct from either No. 1 or No. 2, allowing the use of mechanical devices with non-volatile liquids, and changing completely the mode of action of either the above-mentioned systems.

In previous ice or refrigerating machines using liquid ammonia, the liquid ammonia is volatilized by relieving the pressure on the liquid by means of an aspiration and compression-pump driven by a steam-engine, recourse being had to mechanical compression and cooling to produce back the liquefaction of the ammonia-gas, excessive pressures of one hundred and fifty to two hundred and fifty pounds, and more, being often reached.

In the machines employing saturated water solutions of ammonia, such as the Carré machine, no mechanical power of compression is used; but it is by the pressure exerted by the gas expelled from its water solution by heat on itself, aided by proper cooling, that the liquefaction of the gas is obtained; but such pressures are as great as, if not higher yet than, the preceding.

In this new system recourse has been had to the above-mentioned property of absorption of glycerine for ammonia-gas to produce such liquefaction, thus substituting for the mechanical power relied upon so far a chemical power of affinity and absorption, thereby effecting a saving in the power required, and consequent saving in the coal consumed to produce a certain number of negative units of heat or cold, and avoiding the great pressures mentioned and the difficulties of management of machines working under such pressures.

Figure 1 in the accompanying drawings is a sectional elevation of an apparatus for carrying out our process. Figs. 2, 3, and 4 illustrate different positions of certain of the cocks on the apparatus.

The glycerine, saturated with gas-ammonia prepared by any approved method, such as the decomposition of sal-ammoniac by lime under the influence of heat, or any other method, is introduced into an iron vessel, A, which may be in the form of a tubular steam-boiler, a system of coils, or any other suitable mechanical contrivance. This vessel we call the "refrigerator." It may be put in communication, by a pipe, B, with the suction-pipe of a double-acting aspiration and compression pump, P, driven by a steam-engine or any other mechanical power. A second refrigerator, A', similar to the first in every respect, and also containing the liquid absorbent or non-saturated solution, is put in communication with the suction-pipe of the pump by a pipe, B'. A three-way cock, D, at the junction of pipes B and B', commands both refrigerators, and at pleasure can be worked, either by hand or automatically, by a crank-lever connected with the engine. Both refrigerators are immersed in iron tanks T T', through which circulates a non-congealable mixture, (solution of chloride of magnesium or common salt in water, &c.) The cans F, containing the water to be frozen, are placed upright in these tanks, and the brine circulates around them. In large machines an independent freezing-tank can be used with proper return of the brine by means of a circulating-pump to the refrigerator-tanks T T'.

In case ice is not to be made, but refrigeration by cold brine is required, the same brine is caused to circulate through a system or coil of pipes or appropriate contrivances.

The discharge-pipe of the pump P is in communication, by a pipe, E, with an iron vessel, C, called the "condenser," and which may be in the form of a tubular boiler, a coil, &c. This condenser is immersed in a tank, T², through which a stream of cooling-water is caused to circulate.

Both refrigerators A A' communicate with the condenser C by small pipes G G' G*, the pipes G G' starting from the bottoms of their respective refrigerators, and joining at a three-way cock, H, which discharges into a single-acting circulating-pump, I, driven by the steam-engine. The cock H is worked by hand or automatically by the steam-engine. From the pump the pipe G* discharges into the bottom of the condenser C. The condenser C communicates with the refrigerators A A' by small pipes K K' K*, which are connected together at a three-way cock, L, worked by hand or automatically by the steam-engine. The pipe K* starts from the bottom of the condenser C, and those K K' reach to the bottom of the refrigerators A A'.

The operation is as follows: The pump P being started, and the three-way cock D being in the position shown in Fig. 1, communication exists between the pump and the refrigerator A, is cut off from refrigerator A', and, a vacuum being produced mechanically in A, volatilization of the ammonia therein takes place, producing an intense cold, which is communicated to the brine in the tank T, and by it to the water in the cans F F. The glycerine in the refrigerator A remains, the degree of its saturation being diminished, and the cock D is kept in the just-mentioned position until the solution in that refrigerator is substantially deprived of its ammonia. The gaseous ammonia during this period enters the pump, and is expelled into the condenser C, which contains a certain amount of pure glycerine, supplied from the refrigerator A' by means of the pump I, as will be further described, by which it is absorbed under no or very low pressure, reconstituting the standard glycerine solution in the condenser, the heat of absorption being carried away by the circulation of water in tank T², thus avoiding the mechanical compression of one hundred and fifty to three hundred pounds, otherwise necessary to bring about the liquefaction of the ammonia-gas. While the saturated solution is being thus reconstituted in C, the three-way cock L is in the position shown in Fig. 1, and communication by the pipes K K' K* between both refrigerators A A' and the condenser being cut off, the cock L retains the position above mentioned as long as cock D retains position No. 1.

During this period the refrigerator A is cut off from its communication with the small circulating liquid-pump I, cock H being in the position No. 1, and refrigerator A', on the contrary, communicates with I, which pumps the non-saturated glycerine from A' into the condenser C, where this glycerine becomes saturated with the gas-ammonia from the pump P. Cock H remains in position No. 1 so long as cock D remains in position No. 1. At the end of this period, when A is sufficiently exhausted of ammonia, and contains only glycerine, the condenser C being full of reconstituted saturated solution, and A' being empty, the contents of C are allowed to run, by their own pressure, into refrigerator A' by placing cock L in position shown in Fig. 2. Cock H, at the same time, being put in position shown in Fig. 3, pump I is ready to pass some of the exhausted glycerine from refrigerator A into condenser C. Cock D is placed in position shown in Fig. 4, and pump P is then ready to draw the gas-ammonia from the saturated solution in A'. In short, in A and A' the solution is exhausted of its ammonia alternately, thus producing cold, and the glycerine is sent into C to be reconstituted into the glycero-ammoniacal liquid.

In the above description our intention was to show in a general manner the mode of operation in the different stages.

Suitable regulating cocks and valves can be applied. The details of the apparatus may be modified to adapt it to the requirements of the process.

We may remark that we are not necessarily limited to the particular apparatus described for carrying out our process, but have selected that apparatus for illustration, being well adapted to the purpose, and the same apparatus might be used for producing a similar refrigerating process by the use of a binary composed of some other non-volatile absorbent liquid and some other volatile refrigerant.

What we claim as our invention, and desire to secure by Letters Patent, is—

1. The method of producing cold by the use of a binary liquid composed of a non-volatile absorbent and a volatile absorbed material, consisting in first producing the volatilization of such absorbed material from the absorbent by a mechanical reduction of pressure, and afterward reconstituting the binary liquid by a restoration of pressure in a cooled vessel, substantially as described.

2. The method of producing cold by the application of the property of absorption of ammonia by glycerine, consisting in first producing the volatilization of ammonia from a solution of gaseous ammonia in glycerine by a mechanical reduction of pressure in a vessel in which the said solution is contained, and afterward reconstituting the solution by passing the exhausted glycerine and the volatilized ammonia by separate channels into a cooled vessel, in which the reabsorption is allowed to take place by the mechanical restoration of the pressure, substantially as herein described.

3. The combination, in a cold-producing apparatus or ice-machine, of two refrigerators for containing a binary liquid composed of a non-volatile absorbent liquid and a volatile refrigerant absorbable therein, a condenser, an air-pump having its suction-pipe connected with each of the said refrigerators, and its discharge-pipe connected with the condenser, a liquid-circulating pump having its suction-pipe connected with each of the said refrigerators, and its exhaust-pipe connected with the condenser, pipes connecting each refrigerator with the condenser independently of said air and liquid circulating pump, and cocks for opening and closing the communications of the several pipes with the refrigerators, substantially as herein described.

AUGUSTE J. ROSSI.
LEONARD F. BECKWITH.

Witnesses:
HENRY T. BROWN,
FREDK. HAYNES.